(12) United States Patent
Epstein et al.

(10) Patent No.: US 8,914,260 B2
(45) Date of Patent: *Dec. 16, 2014

(54) METHOD AND SYSTEM FOR CREATING AN ELECTRIC VEHICLE CHARGING NETWORK

(75) Inventors: Michael L. Epstein, Bedminster, NJ (US); Christopher K. Dyer, Madison, NJ (US); Duncan Culver, Howell, NJ (US)

(73) Assignee: Lightening Energy, Dover, NJ (US)

( * ) Notice: Subject to any disclaimer, the term of this patent is extended or adjusted under 35 U.S.C. 154(b) by 262 days.

This patent is subject to a terminal disclaimer.

(21) Appl. No.: 13/327,231

(22) Filed: Dec. 15, 2011

(65) Prior Publication Data

US 2012/0221299 A1    Aug. 30, 2012

Related U.S. Application Data

(60) Provisional application No. 61/524,501, filed on Aug. 17, 2011, provisional application No. 61/559,927, filed on Nov. 15, 2011.

(51) Int. Cl.

| | |
|---|---|
| *G06F 17/50* | (2006.01) |
| *G06Q 10/00* | (2012.01) |
| *G06Q 40/00* | (2012.01) |
| *B60L 11/18* | (2006.01) |
| *G06Q 20/10* | (2012.01) |

(52) U.S. Cl.
CPC .......... *B60L 11/1824* (2013.01); *G06Q 20/102* (2013.01); *Y02T 90/168* (2013.01); *Y04S 30/12* (2013.01); *Y02T 10/7088* (2013.01); *Y02T 10/7005* (2013.01); *Y02T 90/12* (2013.01); *Y02T 90/14* (2013.01)
USPC .................................. 703/1; 705/1.1; 705/40

(58) Field of Classification Search
CPC .......... G06F 17/50; G06Q 30/00; B60L 3/12; B60L 11/1824; Y02T 10/7088; Y02T 90/168; Y02T 10/7005; Y02T 90/12; Y02T 90/14; Y04S 30/12
USPC .................................. 703/1; 705/406, 1.1, 40
See application file for complete search history.

(56) References Cited

U.S. PATENT DOCUMENTS

| | | |
|---|---|---|
| 2008/0040263 A1 | 2/2008 | Pollack et al. |
| 2008/0228613 A1 | 9/2008 | Alexander |
| 2009/0062967 A1* | 3/2009 | Kressner et al. .............. 700/286 |
| 2009/0066287 A1* | 3/2009 | Pollack et al. ................ 320/101 |
| 2010/0049572 A1 | 2/2010 | Berman |
| 2010/0161481 A1* | 6/2010 | Littrell ........................... 705/40 |
| 2010/0211643 A1 | 8/2010 | Lowenthal et al. |
| 2010/0241560 A1 | 9/2010 | Landau-Holdsworth et al. |
| 2011/0191186 A1 | 8/2011 | Levy et al. |
| 2011/0191265 A1 | 8/2011 | Lowenthal et al. |
| 2012/0086396 A1 | 4/2012 | Pan et al. |
| 2012/0089329 A1 | 4/2012 | Kim et al. |
| 2012/0173292 A1 | 7/2012 | Solomon et al. |
| 2012/0191242 A1 | 7/2012 | Outwater |

* cited by examiner

*Primary Examiner* — Aniss Chad
(74) *Attorney, Agent, or Firm* — Davidson, Davidson & Kappel, LLC

(57) ABSTRACT

A method for creating an electric vehicle charging network includes receiving first location data from a first remote device; providing electric vehicle charger data to the first remote device as a function of the first location data; receiving second location data from a second remote device; providing the electric vehicle charger data to the second remote device as a function of the second location data; and, in response to the electric vehicle charger data, receiving interest data from the first and second remote devices to permit creation of a first electric vehicle charger. Further methods and systems are provided.

9 Claims, 10 Drawing Sheets

Recharger at the Corner of 44 & 299

| | |
|---:|:---|
| ID# : | 725 ←22 |
| Plug Type : | CHAdeMO ←24 |
| Location : | Parking Lot ←26<br>Mountain Brauhaus<br>123 Route 44<br>New Paltz 12561 |
| Brand : | ABB Terra 51 Charge Station ←28 |
| # Participants : | 6 ←30 |
| Cost/Participant : | $1500.00 ←32 |
| Current Participants : | abc 123 ←34 |

[ Participate ] ←36

Recharger at the Corner of 32 & 299

ID# :  663 — 222

Type :  SAE J1772 — 224

Location :  Texaco — 226
536 Main St.
New Paltz 12561

Brand :  Bosch — 228

Participants :  6 — 230

Cost/Participant :  $1200.00 — 232

Current Participants :  xyz 123 — 234
ddk 100
joey 7

[ Participate ] — 236

FIG. 4

Participate in 663

─238

| Contract Details |      ─240

| | 12AM | 3AM | 6AM | 9AM | NOON | 3PM | 6PM | 9PM | 12PM |
|---|---|---|---|---|---|---|---|---|---|
| Mon | | | | xyz 123 | | | Joey 7 | | |
| Tues | | | | xyz 123 | | | Joey 7 | | |
| Wed | | | | xyz 123 | | | Joey 7 | | |
| Thu | | | | xyz 123 | | | Joey 7 | | |
| Fr | | | | xyz 123 | | | Joey 7 | | |
| Sa | | | | | ddk100 | | | | |
| Su | | | | | ddk100 | | | | |

Reserved Times ─242

Credit Card Information

Enter Payment [               ]

Contact Website Operator ─244

Contact Participant ─246

| xyz 123 |
|---|
| ddk100 |
| joey 7 |

FIG. 5

Recharger at the Corner of 87 & 299

| | |
|---|---|
| Lighten ID# : | 212 ←322 |
| Type : | TBD ←324 |
| Location : | Town New Paltz Parking Lot ←326<br>Corner Main St. /87 Exit<br>New Paltz 12561 |
| Brand : | TBD ←328 |
| # Participants : | TBD ←330 |
| Cost/Participant : | est Total Cost $8000 ←332 |
| Interested : | xzy 222 ←334<br>john 637 |

- Express Interest ←336
- Become Founder ←338

FIG. 6

Recharger ID# : 212 xzy 222 Interest

Type : SAE J1772 ← 424

Brand : any ← 428

Times : ← 440

| | 12AM | 3AM | 6AM | 9AM | NOON | 3PM | 6PM | 9PM | 12PM |
|---|---|---|---|---|---|---|---|---|---|
| Mon | | | | | | | X | | |
| Tues | | | | | | | X | | |
| Wed | | | | | | | X | | |
| Thu | | | | | | | X | | |
| Fr | | | | | | | X | | |
| Sa | | | | | | | | | |
| Su | | | | | | | | | |

Contact ← 446

FIG. 7

METHOD AND SYSTEM FOR CREATING AN ELECTRIC VEHICLE CHARGING NETWORK

This claims the benefit of U.S. Provisional Patent Applications 61/524,501 and 61/559,927, filed on Aug. 17, 2011 and Nov. 15, 2011 respectively, both of which are hereby incorporated by reference herein.

BACKGROUND

Electric vehicle (EV) recharging networks have begun to be established in various parts of the world. For example, Tesla Motors has developed a fast DC recharger network in California.

Typical chargers for electric vehicles, including hybrid electric vehicles, include Level I, Level II and fast DC rechargers, which typically will use either a CHAdeMo or SAE J1772 standard.

SUMMARY OF THE INVENTION

However, even faster rechargers are envisioned, including battery-swapping stations. The cost of these future stations as well as fast DC rechargers and even lower level rechargers may be expensive for various reasons, including location or real estate costs.

In addition, the logistics of creating and operating an EV charging network that meets the needs of a certain EV owner community is difficult, and creating such a network from the "top down" is, in the view of the present inventors, difficult.

The present invention envisions creating an electric vehicle charging network from the "bottom up" and provides a system and method for creating such a network.

The present invention provides a method for creating an electric vehicle charging network comprising:
 receiving first location data from a first remote device;
 providing electric vehicle charger data to the first remote device as a function of the first location data;
 receiving second location data from a second remote device;
 providing the electric vehicle charger data to the second remote device as a function of the second location data; and
 in response to the electric vehicle charger data, receiving interest data from the first and second remote devices to permit creation of a first electric vehicle charger.

The present invention also provides a method for creating an electric vehicle charging network comprising:
 receiving first location data from a first remote device;
 providing possible location data for a first electric vehicle charger as a function of the first location data;
 receiving first interest data from the first remote device in the first electric vehicle charger; and
 providing the first interest data to a second remote device to generate further interest data in the first electric vehicle charger.

The present invention also provides a method for creating an electric vehicle charging network comprising:
 receiving first location data from a first remote device;
 providing electric vehicle charger data to the first remote device as a function of the first location data;
 in response to the electric vehicle charger data, receiving data from the first remote device indicating interest in creating a first electric vehicle charger so as to define first interest data;
 providing the first interest data to a second remote device; and
 in response to the first interest data, receiving second location data including actual location data for a first electric vehicle charger.

The present invention also provides a computerized system for creating an electric vehicle charging network comprising:
 a server;
 a plurality of remote devices capable of communicating with the server, including a first remote device and a second remote device;
 the server including first location data from the first remote device, electric vehicle charger data, second location data from the second remote device, interest data from the first and second remote devices, and first electric vehicle charger data, the first electric vehicle charger data being a function of the interest data.

The present invention also provides a computerized system for creating an electric vehicle charging network comprising:
 a server;
 a plurality of remote devices capable of communicating with the server, including a first remote device and a second remote device;
 the server including first location data from the first remote device, possible location data for a first electric vehicle charger as a function of the first location data, first interest data from the first remote device in the first electric vehicle charger, and further interest data from the second remote device in the first electric vehicle charger.

The present invention also provides a computerized system for creating an electric vehicle charging network comprising:
 a server;
 a plurality of remote devices capable of communicating with the server, including a first remote device and a second remote device;
 the server including first location data from the first remote device, first interest data from the first remote device, second location data from the second remote device as a function of the first interest data, the second location data including actual location data for a first electric vehicle charger.

BRIEF DESCRIPTION OF THE DRAWINGS

One embodiment of the method and system of the present invention may be further described using the following drawings, in which:

FIG. 3 shows the first GUI of the first remote device with data concerning possible recharging station 104 of FIG. 2;

FIG. 4 shows the first GUI of the first remote device with data concerning possible recharging station 106 of FIG. 2;

FIG. 5 shows the first GUI of the first remote device with a web page permitting input of data concerning possible participation in creating recharging station 106 of FIG. 2;

FIG. 6 shows a second GUI of a second remote device with data concerning the possible recharging station 120 of FIG. 2;

FIG. 7 shows the second GUI of the second remote device with a web page permitting input of data concerning possible participation in creating recharging station 120 of FIG. 2;

DETAILED DESCRIPTION OF THE PREFERRED EMBODIMENT

Figure 1:
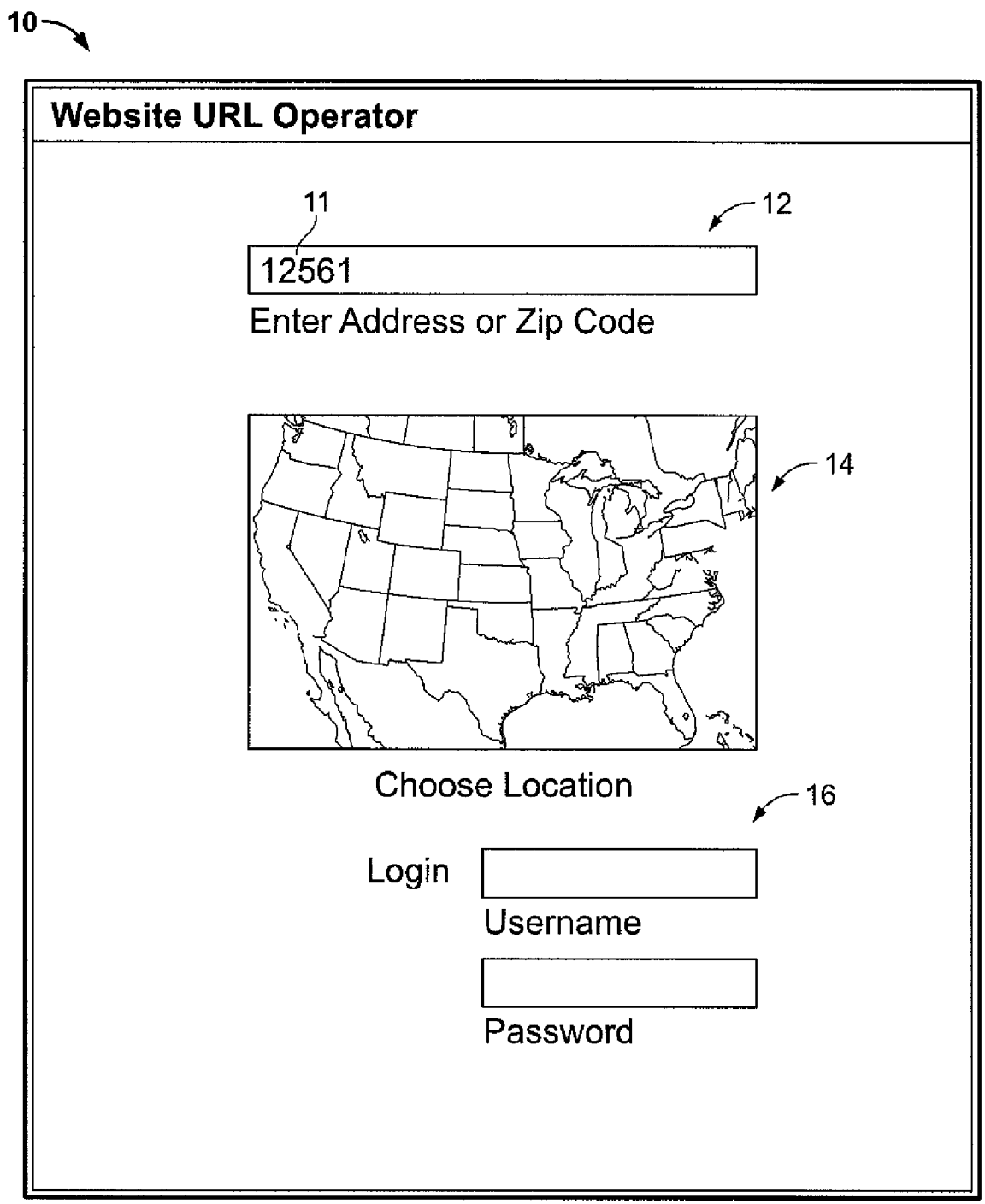
FIG. 1 shows a first GUI of a first remote device with a web page for receiving first location data.

FIG. 1 shows a first graphical user interface (GUI) of a first remote device with a web page 10 for receiving first location data 11. The first remote device may be any device capable of interacting as a client with a server, for example a home computer, cell phone with web capabilities, or tablet, connected for example via a TCP/IP protocol to a server. The first remote device may have voice capabilities as well for providing or receiving any of the information herein.

Web page 10 permits a user of the first remote device to enter first location data 11, for example via an address or zip code field 12, a map 14 permitting receipt of for example a mouse pointer information, or via a log-in field 16 where the users location information is already known, for example via a database.

Figure 2:
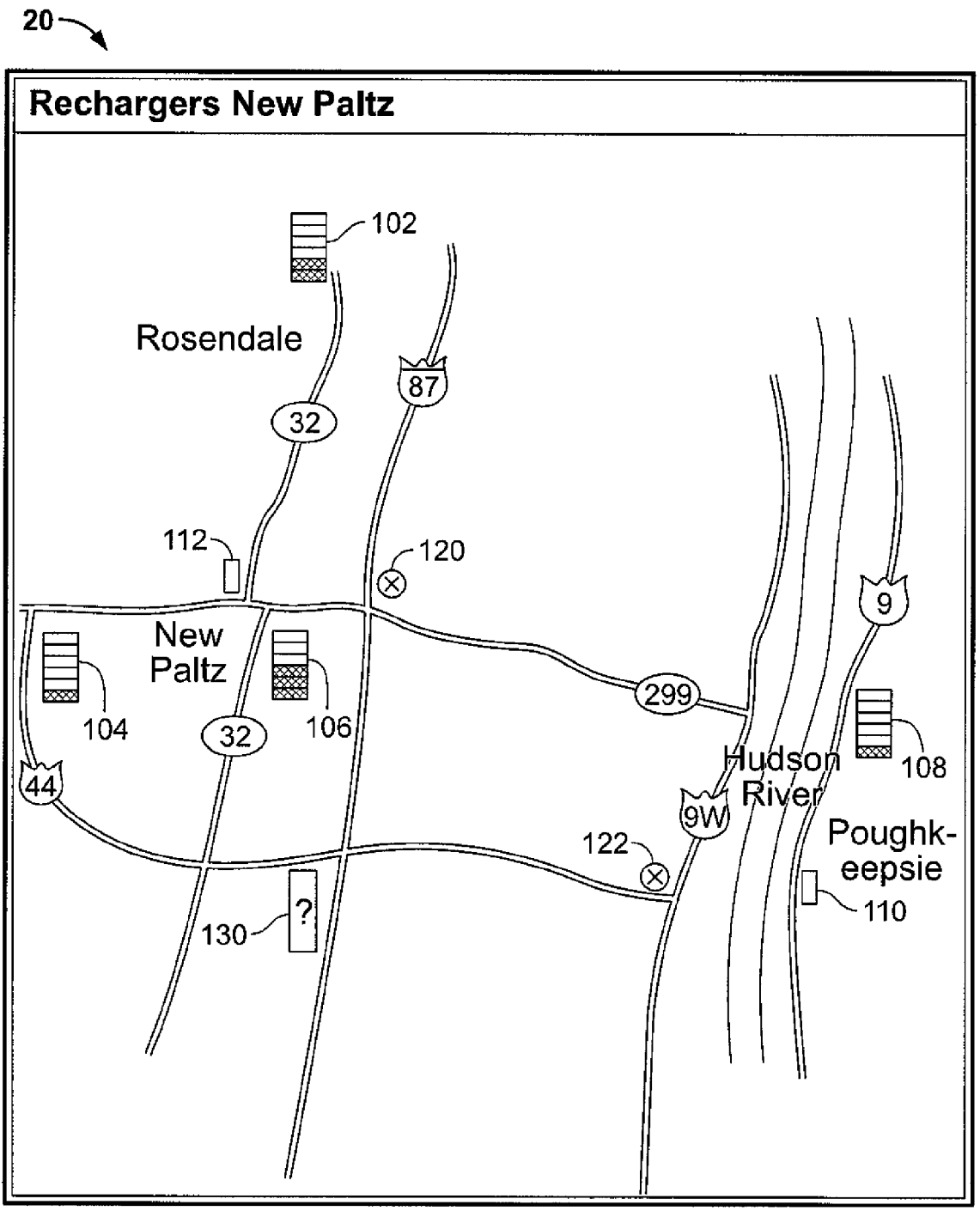
FIG. 2 shows the first GUI of the first remote device with a web page providing data on various existing and possible electric vehicle recharging stations.

The first location data 11, here a zip code, can be received at a server providing web page 10, and in response to the first location data 11 the server can provide data concerning an existing or envisioned network of electric vehicle rechargers via for example a web page 20, as shown in FIG. 2.

The data in FIG. 2 may include a map indicating for example completed electric vehicle rechargers 110, 112, possible electric vehicle rechargers 102, 104, 106, 108 with interest data including payment data and actual location data concerning the rechargers already received and stored by the server, possible electric vehicle rechargers 120, 122 with actual location data concerning the rechargers stored by the server, but no payment data yet received, and possible electric vehicle recharger 130 with interest data but not actual location data yet received.

FIG. 2 thus represents an overview of an existing and possible electric vehicle recharging network in which members of a social network or simply those accessing a website may be provided not only with information regarding existing electric vehicle rechargers 110, 112 in the network, but also in one embodiment on becoming participants in building up the network, for example by investing and providing payment data for shares in possible electric vehicle rechargers 102, 104, 106 and 108.

In yet further embodiments of the present invention the method and system of the present invention permit landowners and others to provide actual location data, for example so that possible electric rechargers 120, 122 are created, and in yet another embodiment for users simply to express certain partial interest in creating an electric vehicle charger 130 in a certain general location.

An entire vehicle charging network thus can be created from the bottom up based on actual needs and desires of the participants of the network.

The creation of the network will now be described in greater detail.

FIG. 3 shows the first GUI of the first remote device with data concerning possible recharging station 104 of FIG. 2. Upon for example, clicking by a user of the first remote device on the graphical representation of recharging station 104, current data on the possible recharging station 104 can be provided to the first remote device. The electric vehicle recharger data may include network ID data 22, plug or recharger type data 24, location data 26, brand data 28, participant number data 30, cost data 32, current participant data 34 and a participate button 36.

For this possible station 104, solely one participant has provided payment data, and if the system is so designed, access to the participant, for example via email contact may be provided. In a preferred embodiment, access to the participant is only provided if the user of the first remote device and the participant are members of a social network, for example the social network running the server.

FIG. 3 thus provides the first remote device with data including actual location data and participant data, the participant having already provided interest and payment data to the server. The user of the first remote device thus can be assured that submission of payment data by a certain number of participants, here a total of six participants, will result in creation of the electric vehicle recharging station. For example, the operator of the website will create all legal documents and purchasing and then forward legal conformation of the participation of the user in the electric recharging station 104. The legal form may vary from state to state or location to location, but may be for example a partnership, time-share, LLC, other contractual relationship or other legal form. In other embodiments, payment may be delayed until later for example after formation of the electric recharger.

The location, cost and other data may have been provided by a lead participant, by the network running the server, by the location owner, a third party or any combination.

FIG. 4 shows the first GUI of the first remote device with data 230 concerning possible recharging station 106 of FIG. 2. The electric vehicle recharger data 230 may include network ID data 222, plug or recharger type data 224, location data 226, brand data 228, participant number data 230, cost data 232, current participant data 234 and a participate button 236. Here, three participants xyz123, ddk100 and joey7 have provided payment already.

Map 20 in FIG. 2 can be updated with visual clues expressing actual participants, for example six bars on location 106 can be shown, with three filled, and one more filled as a further participant joins.

FIG. 5 shows the first GUI of the first remote device with a web page which may result upon clicking of the participate button 236. This web page permits input of data concerning possible participation in creating recharging station 106 of FIG. 2, and also provides for example for the user to receive contract details, for example via a button 238. Any legal documents to be signed or already signed, including for example land lease information and the basis for the cost information may be provided. These details advantageously also may be solely available to members of the social network mentioned above.

Timetable 240 may provide information on desired or reserved charging times and permit the potential participant to reserve charging times. For example for station 106, depending on contract terms, each participant may be entitled to reserve 5 charging times, which could be for example for a length of 30 minutes. Here lengths of 3 hours are shown for clarity. Such reserving of times may encourage earlier participation.

Payment information can be received for example via input 242, and may be cleared for example by the server and operator of the server.

The server operator can also be contacted via input 244, and other participants via input 246 for example.

FIG. 6 shows a second GUI of a second remote device with data concerning the possible recharging station 120 of FIG. 2. The electric vehicle recharger data may include network ID data 322, plug or recharger type data 324, location data 326, brand data 328, participant number data 330, cost data 332, interested participant data 334, an express interest button 336 and a become founder button 338. Here, two participants xyz22 and john637 have expressed interest but not taken any further steps. No actual payment has been received. The server operator has provided ID data 322 and estimated cost data 332, based for example on similar locations in the area. A possible lessor has provided actual location data 326. However, the type of recharger, brand number of participants and total cost have not been decided.

In this embodiment, a potential participant could simply decide these fields a founder, by pressing button 338. The operator or further be pages could direct the participant to provide payment and take further steps. In fact, the participant could decide to be the sole owner and have data field for participant number 330 to have the value one. More likely, the potential participant will make a partial investment.

Alternately, the viewer of FIG. 6 could simply express interest via button 336 and be shown FIG. 7. Type interest via input 424, brand interest via input 428 and time interest via timetable 440 could be provided to enable the operator to collect interest information on possible station 120. Data can be sent via a submission or contact button 446.

Figure 8:
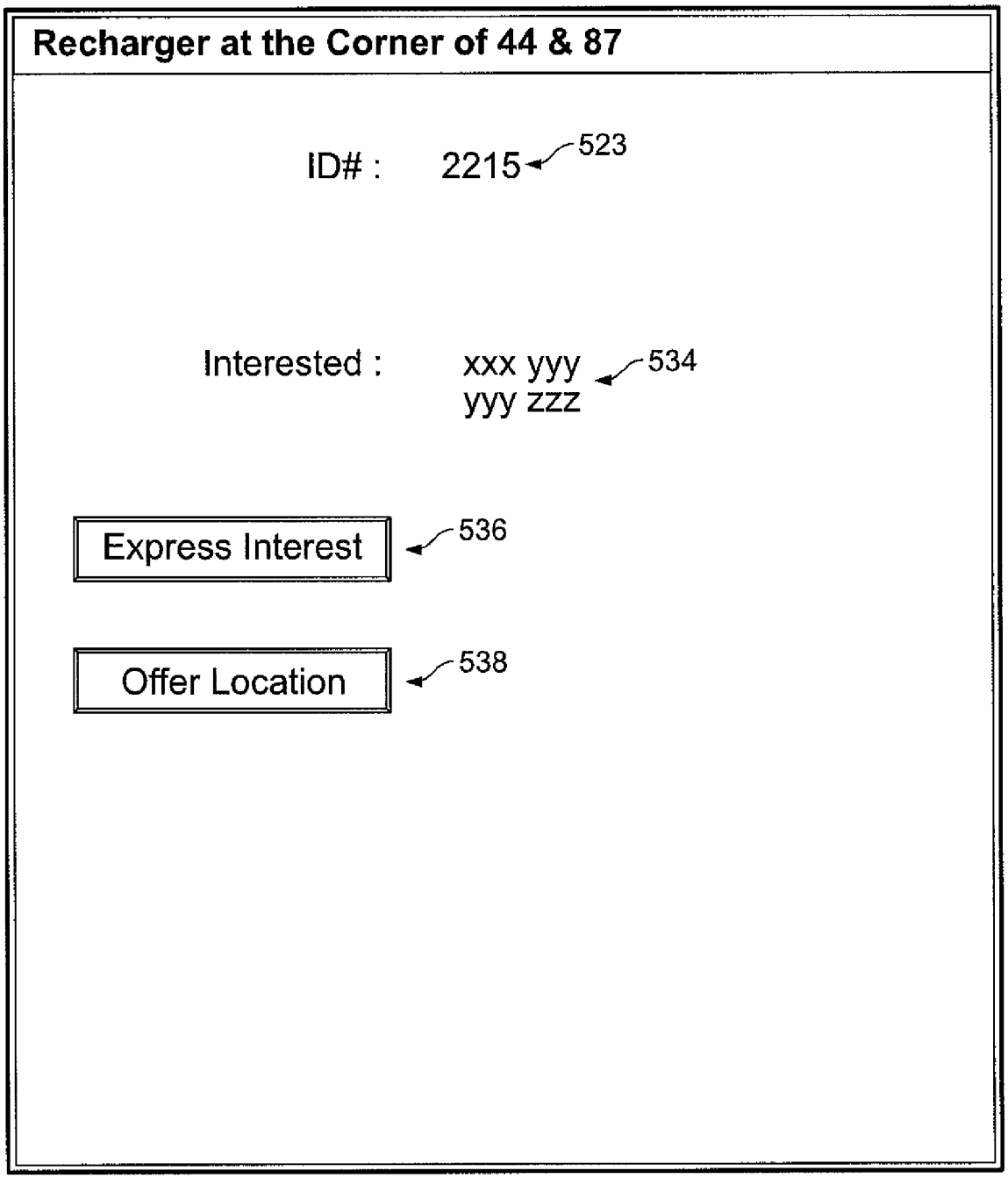
FIG. 8 shows a third GUI of a third remote device with data concerning the possible recharging station 130 of FIG. 2.

FIG. 8 shows a third GUI of a third remote device with data concerning the possible recharging station 130 of FIG. 2. Here interest in the general area has been expressed by 2 parties, shown in field 534. A first party xxxyyy had expressed interest in the general location, for example via clicking a pointer on map 20, and the website operator provided a graphical indicator with a question mark as possible recharger 130, and an ID 522. A second party yyyzzz expressed similar interest via a button 536 and provided some data, for example via a web page similar to that shown in FIG. 7.

Figure 9:
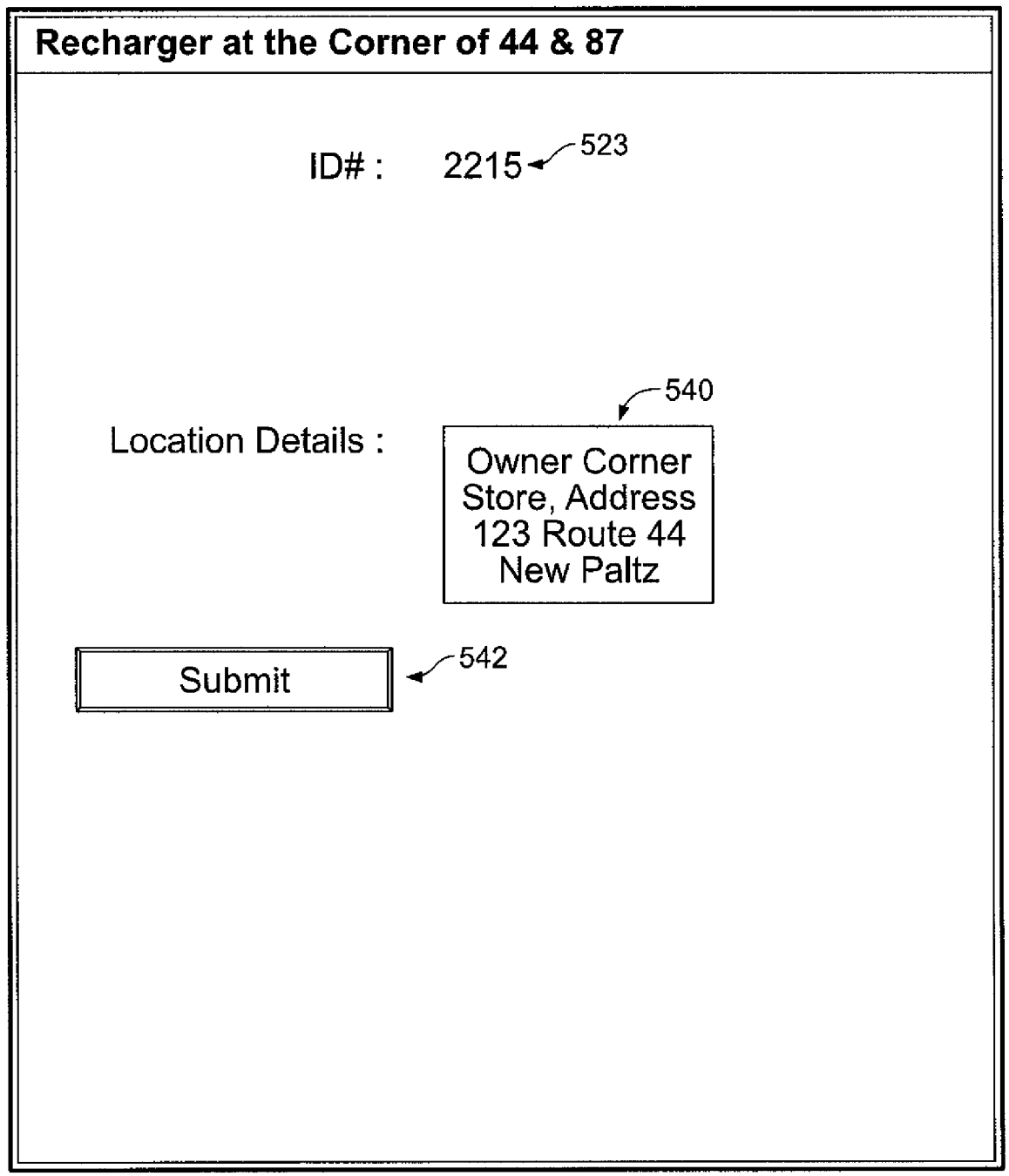
FIG. 9 shows the third GUI of the third remote device with a web page permitting input of data concerning possible participation in creating recharging station 130 of FIG. 2.

Potential lessors or land providers with a third remote device thus can review map 20, and seeing potential interest, offer a location for the recharger, for example via button 538, which can result in the web page of FIG. 9. FIG. 9 shows the third GUI of the third remote device with a web page permitting input of data concerning possible participation in creating recharging station 130 of FIG. 2. ID 523 can be provided along with a data entry box 540 for providing actual location data to the server operator via submission button 542.

Figure 10:
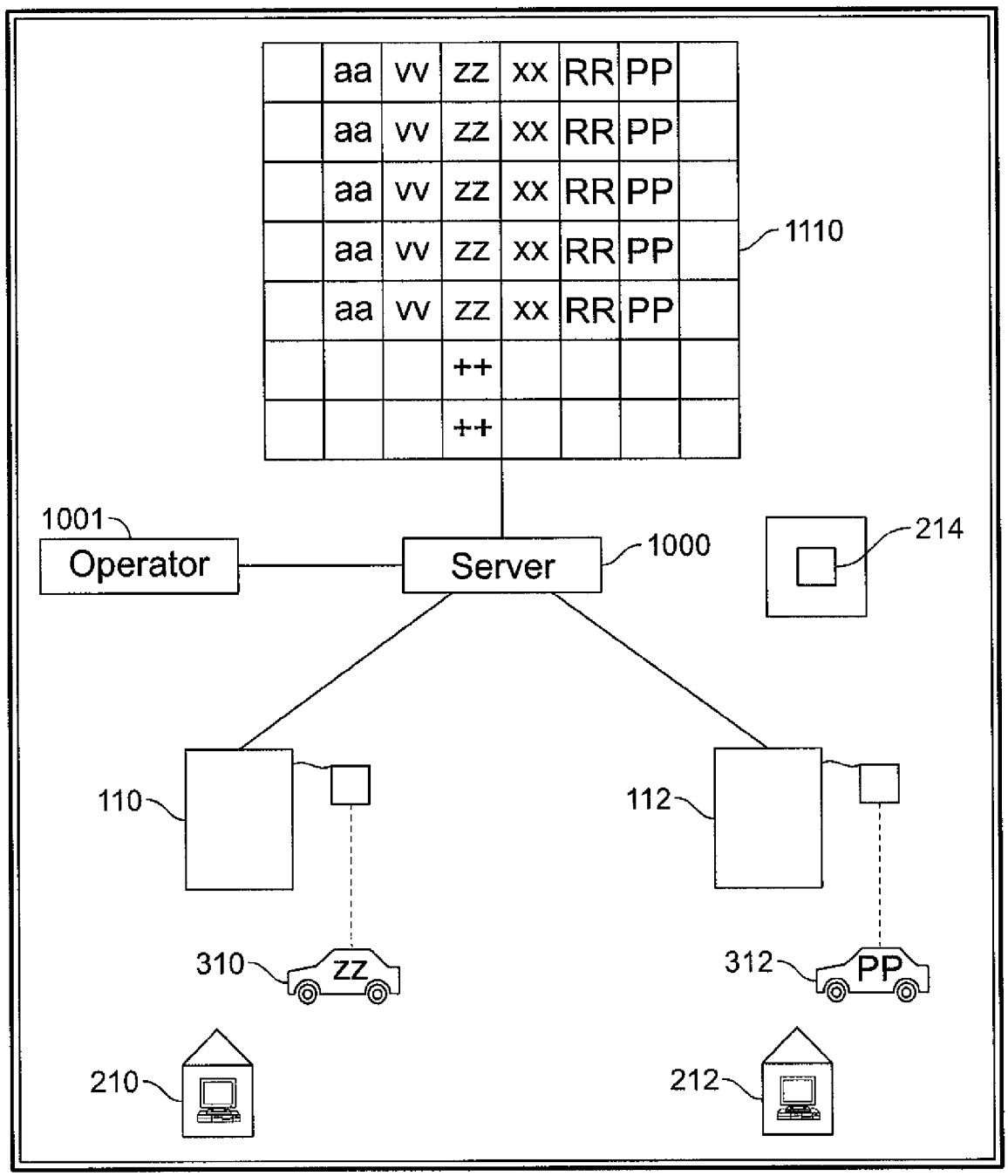
FIG. 10 shows a schematic overview of one embodiment of the system of the present invention.

FIG. 10 shows a schematic overview of one embodiment of the system of the present invention. Operator 1001 operates one or more servers 1000 interacting with remote devices 210, 212, 214. Client device 214 may be that of for example a municipality or gas station owner seeking to provide a location and possible payment for leasing or providing an electric vehicle recharging location, as described above.

Remote devices 210, 212 may be for example home computers of electric vehicle owners or future owners of electric vehicles 310, 312, respectively. These remote devices 210, 212 can be used as described above to create actual electric vehicle recharging stations 110, 112. Timetable 1110 can be used by the operator and server 1000 to control use vehicle charging, for example, by permitting only those users via for example a passcode access to recharging stations 110, 112 during certain times.

What is claimed is:

1. A computerized system for creating an electric vehicle charging network comprising:
   a server capable of communicating with a plurality of remote devices including a first remote device and a second remote device;
   the server including first location data from the first remote device, electric vehicle charger data relating to an electric vehicle charger not yet existing, second location data from the second remote device, interest data from the first and second remote devices, the electric vehicle charger data being a function of the interest data, wherein server is configured to provide a graphical user interface on the first remote device and the second remote device indicating at least one of participant data and payment data for creating the electric vehicle charger.

2. The computerized system as recited in claim 1 wherein the graphical user interface provided by the server on the first remote device and the second remote device indicating the at least one of participant data and payment data for creating the first electric vehicle charger further includes the current level of at least one of participant data and payment data for creating the first electric vehicle charger.

3. The computerized system as recited in claim 2 wherein the interest data indicates the user of at least one of the first and second remote devices expressed a commitment in creating the first electric vehicle charger, the server being configured to receive the interest data from the first and second remote devices and, in response the interest data, to update the current level of at least one of participant data and payment data for creating the first electric vehicle charger.

4. The computerized system as recited in claim 1 wherein the server is configured to provide the possible location data for the first electric vehicle charger as a function of the first location data as a graphical user interface showing at least one possible location for the first electric vehicle charger on the first remote device.

5. The computerized system as recited in claim 4 wherein the graphical user interface showing the possible location for the first electric vehicle charger includes a map illustrating the possible location for the first electric vehicle charger.

6. The computerized system as recited in claim 5 wherein the map further illustrates at least one completed electric vehicle recharger.

7. The computerized system as recited in claim 5 wherein the possible location for the first electric vehicle charger is provided on the map as a selectable graphical representation, the server being configured to, in response to selection of the graphical representation by the user of the first or second remote device, provide a graphical user interface on the first or second remote device displaying current data of the first electric vehicle charger.

8. The computerized system as recited in claim 5 wherein the graphical user interface displaying the current data of the first electric vehicle charger includes fields editable by the user of the first or second remote device.

9. A computerized system for creating an electric vehicle charging network comprising:
   a server capable of communicating with a plurality of remote devices including a first remote device and a second remote device;
   the server including first location data from the first remote device, possible location data for a first electric vehicle charger as a function of the first location data, first interest data from the first remote device in the first electric vehicle charger, and further interest data from the second remote device in the first electric vehicle charger, the first electric vehicle charger including an electrical vehicle charger not yet existing, the possible location data indicating a possible location for the first electric vehicle charger, the first interest data indicating the user of the first remote device expressed a commitment in creating the first electric vehicle charger at the possible location, the server being configured to, in response to the first interest data, display a representation on a graphical user interface of the second remote device indicating at least one of participant data and payment data of the user of the first remote device related to creating the first electric vehicle charger at the possible location.

* * * * *